US007447714B1

(12) United States Patent
Mackrory et al.

(10) Patent No.: US 7,447,714 B1
(45) Date of Patent: Nov. 4, 2008

(54) MANAGEMENT OF MULTIPLE VIRTUAL DATA COPIES

(75) Inventors: Mitchell Mackrory, Longmont, CO (US); Michael A. Bucari, Northampton, PA (US)

(73) Assignee: Storage Technology Corporation, Louisville, CO (US)

( * ) Notice: Subject to any disclaimer, the term of this patent is extended or adjusted under 35 U.S.C. 154(b) by 1044 days.

(21) Appl. No.: 10/374,024

(22) Filed: Feb. 25, 2003

(51) Int. Cl.
G06F 12/00 (2006.01)
G06F 7/00 (2006.01)
G06F 11/00 (2006.01)
(52) U.S. Cl. .................. 707/204; 707/1; 707/200; 711/161; 711/162; 714/6; 714/7
(58) Field of Classification Search .............. 707/1, 707/10, 200–205, 104.1; 711/161, 162; 714/6–7
See application file for complete search history.

(56) References Cited

U.S. PATENT DOCUMENTS

| 5,412,801 | A | | 5/1995 | de Remer et al. |
| 5,488,701 | A | | 1/1996 | Brady et al. |
| 5,546,557 | A | * | 8/1996 | Allen et al. ............ 711/111 |
| 5,592,618 | A | | 1/1997 | Micka et al. |
| 5,604,862 | A | | 2/1997 | Midgely et al. |
| 5,673,382 | A | | 9/1997 | Cannon et al. |
| 5,742,792 | A | | 4/1998 | Yanai et al. |
| 6,336,173 | B1 | * | 1/2002 | Day et al. ............ 711/161 |
| 6,366,988 | B1 | * | 4/2002 | Skiba et al. ............ 711/165 |
| 6,557,089 | B1 | * | 4/2003 | Reed et al. ............ 711/162 |
| 6,587,935 | B2 | | 7/2003 | Ofek |
| 6,697,960 | B1 | * | 2/2004 | Clark et al. ............ 714/15 |
| 6,728,736 | B2 | | 4/2004 | Hostetter et al. |
| 6,748,502 | B2 | * | 6/2004 | Watanabe et al. ........ 711/158 |
| 6,757,778 | B1 | * | 6/2004 | van Rietschote ............ 711/6 |
| 6,792,518 | B2 | | 9/2004 | Armangau et al. |
| 6,813,683 | B2 | | 11/2004 | Tabuchi et al. |
| 6,834,324 | B1 | * | 12/2004 | Wood ............ 711/111 |
| 6,889,285 | B2 | * | 5/2005 | Dawson et al. ............ 711/4 |
| 6,950,871 | B1 | * | 9/2005 | Honma et al. ............ 709/226 |
| 6,996,687 | B1 | * | 2/2006 | Kekre et al. ............ 711/162 |
| 2003/0028514 | A1 | | 2/2003 | Lord et al. |
| 2003/0177266 | A1 | * | 9/2003 | Britton ............ 709/245 |
| 2004/0044830 | A1 | * | 3/2004 | Gibble et al. ............ 711/4 |
| 2004/0153739 | A1 | * | 8/2004 | Trimmer et al. ............ 714/7 |

* cited by examiner

Primary Examiner—Miranda Le
(74) Attorney, Agent, or Firm—Brooks Kushman P.C.

(57) ABSTRACT

More than two copies of data in a storage management system may be managed by directing at least one virtual volume to a receiving management class within the storage management system. Each virtual volume is exported to a third multi-volume copy, unknown to the storage management system, based on the receiving management class. A manifest file is created listing each exported virtual volume.

11 Claims, 6 Drawing Sheets

MANAGEMENT OF MULTIPLE VIRTUAL DATA COPIES

BACKGROUND OF THE INVENTION

1. Field of the Invention

The present invention relates to maintaining copies of data in a storage management system.

2. Background Art

Removable storage media, such as tape cartridges, are often used for long-term data storage. Often, these tape cartridges are held in locations remote from where they are written and read. Remote locations for storing data provide several benefits. First, remote locations tend to be less expensive per square foot than on-site locations. Second, remote locations better ensure that data can be recovered in the event of a catastrophic, on-site disaster. Third, copies of the data may be required for access at off-site locations.

The amount of data that must be stored, both on-site and off-site, continues to increase. One method for dealing with this increase is to use data cartridges that hold a greater amount of data in a given volume. Such data cartridges typically hold multiple data volumes or data sets. One example is multi-volume tape cartridges, each of which can hold one or more virtual tape volumes.

Storage management systems track multi-volume tape cartridges and map the assignment of virtual tape volumes to multi-volume cartridges. In a typical storage management system, two copies of data are written to removable storage media. This results in a given virtual tape volume being recorded on two separate multi-volume cartridges. One multi-volume cartridge is stored locally for archival and/or back-up purposes. The other multi-volume cartridge is sent to an off-site location. The storage management system is configured to record information pertaining to both multi-volume cartridges.

A major problem with such storage management systems is the inability to rapidly retrieve data if the virtual tape volume containing the data cannot be read from the locally-maintained multi-volume cartridge upon which the virtual tape volume has been written. This can occur if the local multi-volume cartridge has been lost, damaged, accidentally overwritten, misplaced, or the like. Even if the physical multi-volume cartridge is found and is in good condition, the data may still not be readable due to difficulties with the storage media including defects, localized damage, wear, aging, and the like. Thus, the only way to obtain the desired data is to recall the off-site multi-volume cartridge, a process which can result in considerable delay and may violate disaster recovery policies.

What is needed is management of data copies which permit a second local removable copy to be maintained by storage systems not inherently designed to handle more than two copies. This management should produce and maintain data copies in a reliable manner without requiring extensive modification of an existing storage management system.

SUMMARY OF THE INVENTION

The present invention provides for managing more than two copies of data in a storage management system.

To this purpose, a method of managing more than two multi-volume copies in a storage management system recognizing only a first multi-volume copy and a second multi-volume copy is provided. Each multi-volume copy holds at least one virtual volume. At least one virtual volume is directed from the first multi-volume copy to a receiving management class within the storage management system. Each virtual volume is exported to a third multi-volume copy based on the receiving management class. This third multi-volume copy is unknown to the storage management system. A manifest file is created listing each exported virtual volume.

In an embodiment of the present invention, a second management class is defined. Each of the exported virtual volumes is assigned to the second management class. This permits additional virtual volumes to be directed to the receiving management class and subsequently exported to the third multi-volume copy without reexporting any virtual volume.

In another embodiment of the present invention, the second multi-volume copy is removed to a location remote from the storage management system.

In still another embodiment of the present invention, a determination is made that at least one exported virtual volume held on the first multi-volume copy is erroneous. Each determined erroneous virtual volume is unlinked from the storage management system. Each of the determined erroneous virtual volumes is imported into the storage management system from the third multi-volume copy.

In yet another embodiment of the present invention, a determination is made that the third multi-volume copy falls beneath a usage threshold. This usage threshold may be based on an amount of valid data remaining on the third multi-volume copy. Virtual volumes held on the third multi-volume copy are identified. At least one virtual volume, including at least one virtual volume identified from the third multi-volume copy, is exported from the storage management system to a fourth multi-volume copy. A new manifest file is produced listing the virtual volumes exported to the fourth multi-volume copy.

A system is also provided. The system includes multi-volume storage devices, each capable of holding multiple data sets. A storage management system writes at least one data set onto each multi-volume storage device. The storage management system writes at least one data set onto both a first multi-volume storage device and a second multi-volume storage device. Each written data set is directed to a receiving management class. Data sets are exported to a third multi-volume storage device based on the receiving management class. A manifest file is created associating the third multi-volume storage device with the exported data sets.

A disaster recovery method supporting local back-up is also provided. Data is written to a first storage media and a second storage media. The second storage media is sent off-site. The data is directed to a receiving management class. The data is written to a third storage media based on the receiving management class. A manifest file is created listing the data written to the third storage media.

The above features, and other features and advantages of the present invention are readily apparent from the following detailed descriptions thereof when taken in connection with the accompanying drawings.

BRIEF DESCRIPTION OF THE DRAWINGS

FIG. 2d is a schematic diagram illustrating a local data recovery according to an embodiment of the present invention.

DETAILED DESCRIPTION OF THE PREFERRED EMBODIMENTS

Figure 1:
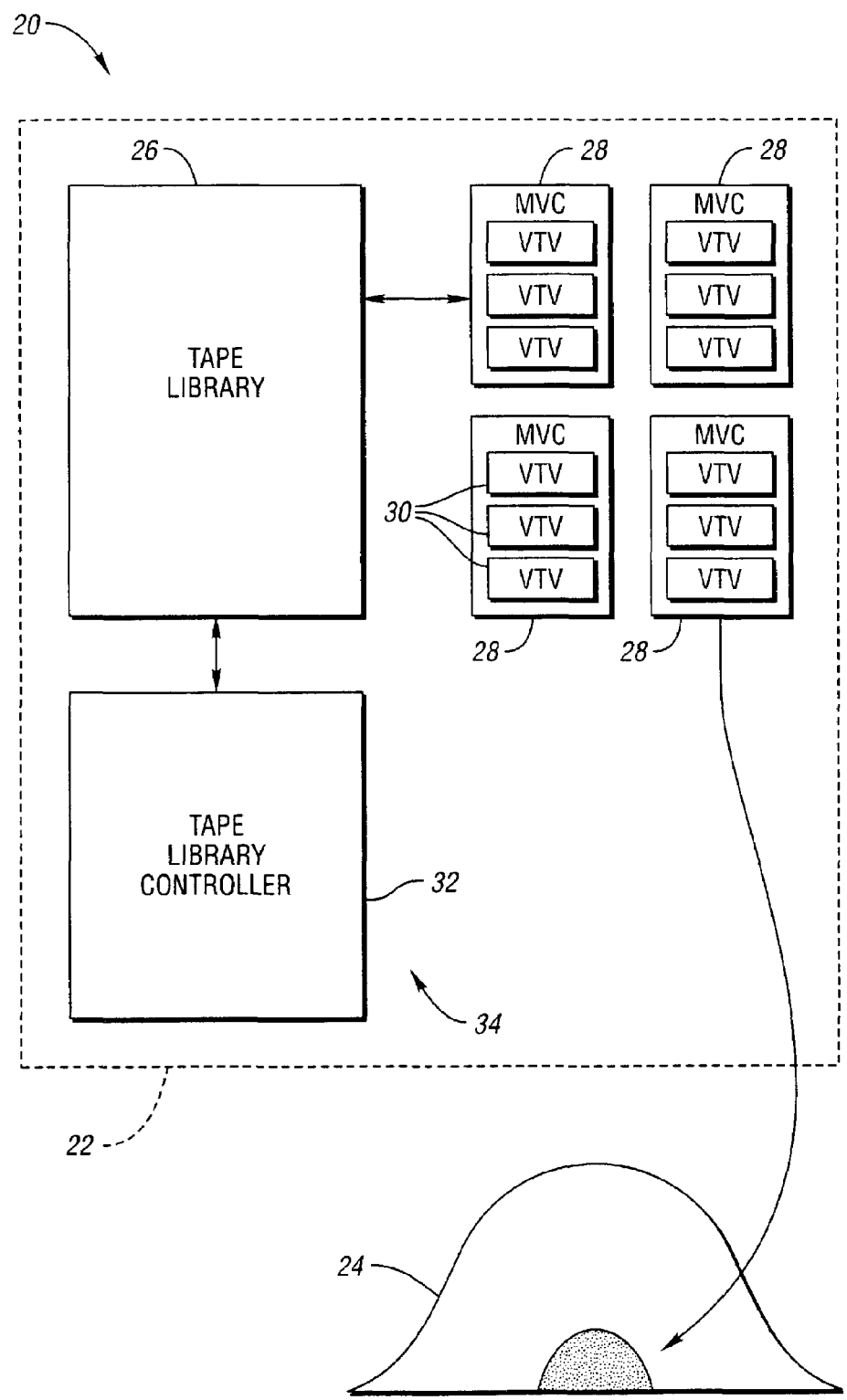
FIG. 1 is a block diagram illustrating a data storage system according to an embodiment of the present invention.

Referring to FIG. 1, a block diagram illustrating a data storage system according to an embodiment of the present invention is shown. A data storage system, shown generally by 20, includes on-site location 22 and off-site location 24. Location 24 is "off-site" relative to on-site location 22 in that storage devices held within off-site location 24 cannot be readily accessed by equipment at on-site location 22.

On-site location 22 includes tape library 26 capable of writing to and reading from multi-volume tape cartridges 28. Tape library 26 typically includes a plurality of tape access devices for simultaneously accessing multiple multi-volume cartridges (MVCs) 28. Tape library 26 may be automated, such as through the use of robotics, may allow for manual loading of cartridges 28, or some combination of manual and automatic operation. Multi-volume tape cartridges 28 typically hold a plurality of virtual tape volumes (VTVs) 30. Each virtual tape volume 30 may appear to a data access device as a physical tape. Multi-volume cartridge 28 may hold information subdivided in a number of ways such as, for example, as separate files, data sets, databases, and the like. Multi-volume cartridges 28 are moved to off-site location 24 for one or more of a variety of purposes, including to support disaster recovery, to reduce the cost of data storage, to provide data accessibility at off-site location 24, or the like.

On-site location 22 includes tape library controller 32 in communication with tape library 26. Tape library controller 32 may be a part of tape library 26 or may be a separate device. Tape library controller 32 may be implemented in a host computer, may be distributed across a plurality of computers, may be a dedicated control device, or the like. Tape library controller 32, tape library 26, and associated support devices together comprise a storage management system, shown generally by 34.

Tape library controller 32 determines virtual tape volume 30 for archiving. Each virtual tape volume 30 so determined is written to two multi-volume cartridges 28 known to control logic within storage management system 34. One multi-volume cartridge 28 is maintained at on-site location 22 and one multi-volume cartridge 28 is sent to off-site location 24. If on-site multi-volume cartridge 28 is lost or damaged, or data held in virtual tape volumes 30 on local multi-volume cartridge 28 cannot be accessed, multi-volume cartridge 28 must be returned from off-site location 24. Returning off-site multi-volume cartridge 28 may create significant delays in data access and may violate data recovery policies that require one copy to be maintained off-site at all times. party tape management system.

Figure 2A:
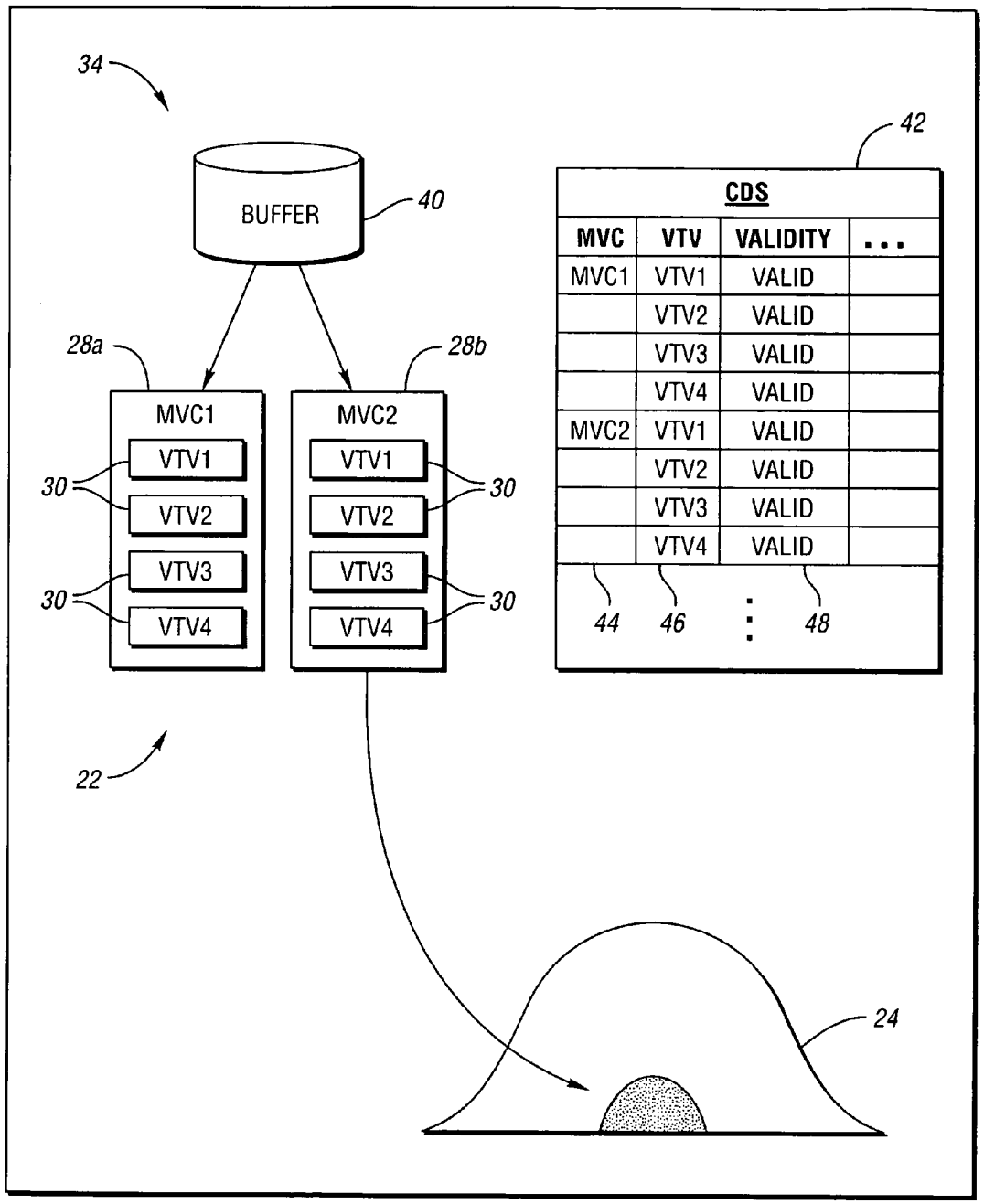
FIG. 2a is a schematic diagram illustrating operation of a storage management system according to an embodiment of the present invention.

Referring now to FIG. 2a, a schematic diagram illustrating operation of a storage management system according to an embodiment of the present invention is shown. Storage management system 34 includes buffer 40 holding data to be written to multi-volume cartridges 28. Buffer 40 may reside in tape library 26, tape library controller 32, or a support device associated with storage management system 34. Buffer 40 may include one or more of solid state memory, magnetic memory, optical memory, and the like. Storage management system 34 also includes an information set, referred to as a control data set (CDS) and referenced by 42, which includes a listing of multi-volume cartridges, indicated by 44, a listing of virtual tape volumes held within each multiple volume cartridge, indicated by 46, and a listing of the validity of each virtual tape volume held by multi-volume cartridge, indicated by 48, as is known by storage management system 34. In an embodiment of the present invention, control data set 42 is implemented as two separate collections. The first set of control information is managed by tape library controller 32. The second set of control information is managed by a third party tape management system.

Virtual tape volumes 30 to be archived for disaster recovery or other purposes are held in buffer 40. These virtual tape volumes 30, illustratively indicated as VTV1, VTV2, VTV3 and VTV4, are written onto a first multi-volume cartridge (MVC1), indicated by 28a. This same set of virtual tape volumes 30 is written onto a second multi-volume cartridge (MVC2), indicated by 28b. Control data set 42 is updated to indicate that both cartridges MVC1 and MVC2 contain valid virtual tape volumes VTV1-4. Second multi-volume cartridge 28b is then sent to off-site location 24.

In the example illustration, each virtual tape volume stored on second multi-volume cartridge 28b was also written onto first multi-volume cartridge 28a. As will be recognized by one of ordinary skill in the art, multi-volume cartridge 28a may actually be more than one cartridge 28. Additionally, data indicated as held by first multi-volume cartridge 28a may also be maintained in any of a variety of storage media such as magnetic tape, optical tape, magnetic disk, optical disk, solid state memory, and the like. The use of the term "multi-volume cartridge" is used for convenience of expression.

Figure 2B:
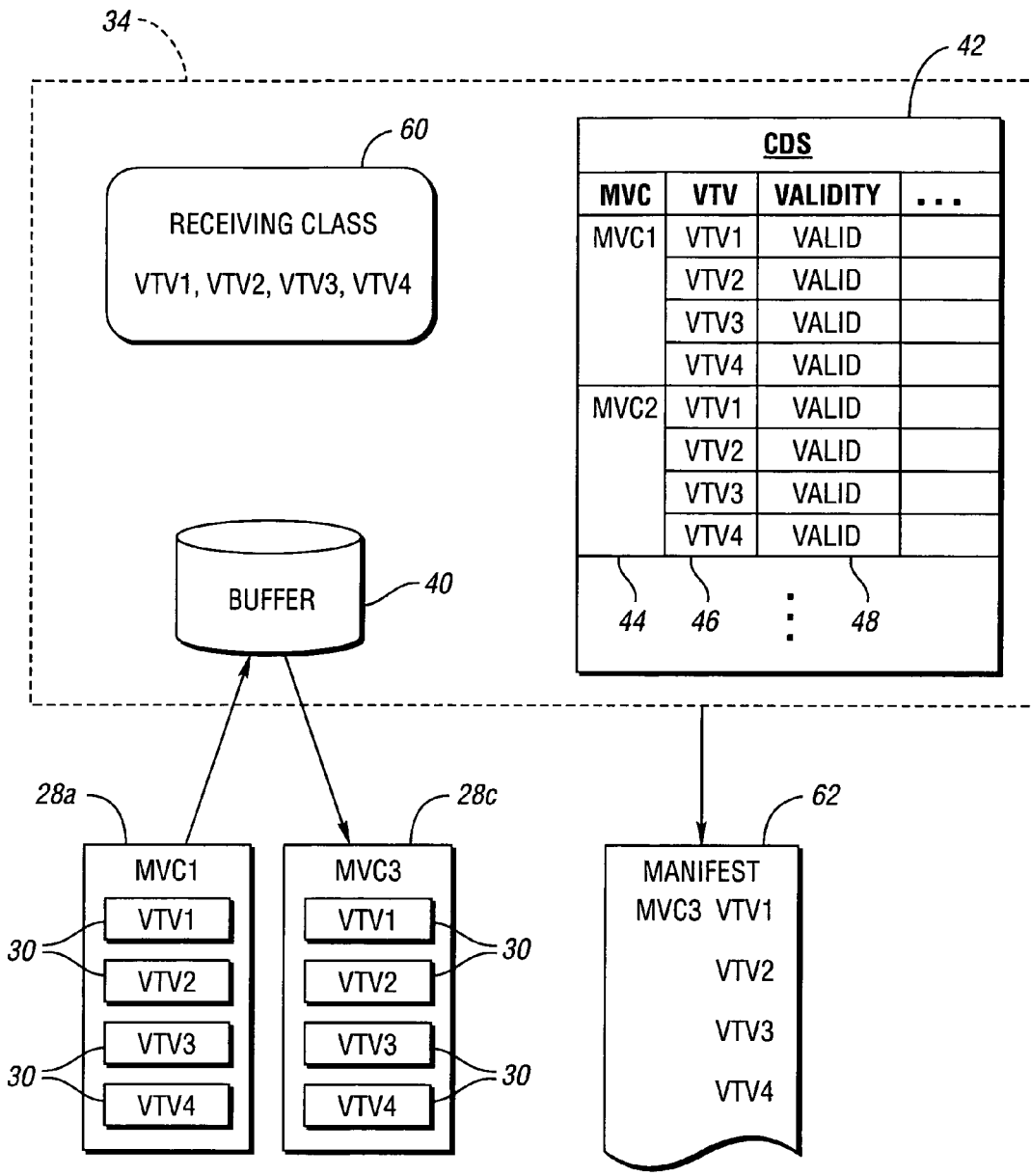
FIG. 2b is a schematic diagram illustrating creation of a third multi-volume copy according to an embodiment of the present invention.

Referring now to FIG. 2b, a schematic diagram illustrating creation of a third multi-volume copy according to an embodiment of the present invention is shown. Storage management system 34 defines receiving management class 60 capable of referencing virtual tape volumes 30 to be written onto a third multi-volume cartridge (MVC3), indicated by 28c. Receiving class 60 may be temporary or persistent within storage management system 34 and may be implemented as an object, file, or the like.

Virtual tape volumes 30 to be copied are directed to receiving class 60. This may occur automatically as part of the process of writing multi-volume cartridges 28a and 28b or may be triggered as a separate operation. Virtual tape volumes 30 to be listed in receiving class 60 may be expressly stated or may be determined by a masking operation on the name of each virtual tape volume 30. In this latter case, a naming convention is chosen for automatically triplicating certain virtual tape volumes 30.

Virtual tape volumes 30 are then exported from storage management system 34 onto MVC3. In one embodiment, virtual tape volumes 30 are read from MVC1 into buffer 40 and then written from buffer 40 into MVC3. In another embodiment, MVC1 and MVC3 are both written contemporaneously from buffer 40.

Exporting virtual tape volumes 30 onto MVC3 creates manifest file 62 indicating which virtual tape volumes 30 are held on multi-volume cartridge 28c. Manifest 62 is preferably a metadata file accessible by storage management system 34. However, manifest file 62 may be implemented in a variety of ways including hard copy, database, linked list, object instantiation, and the like.

Figure 2C:
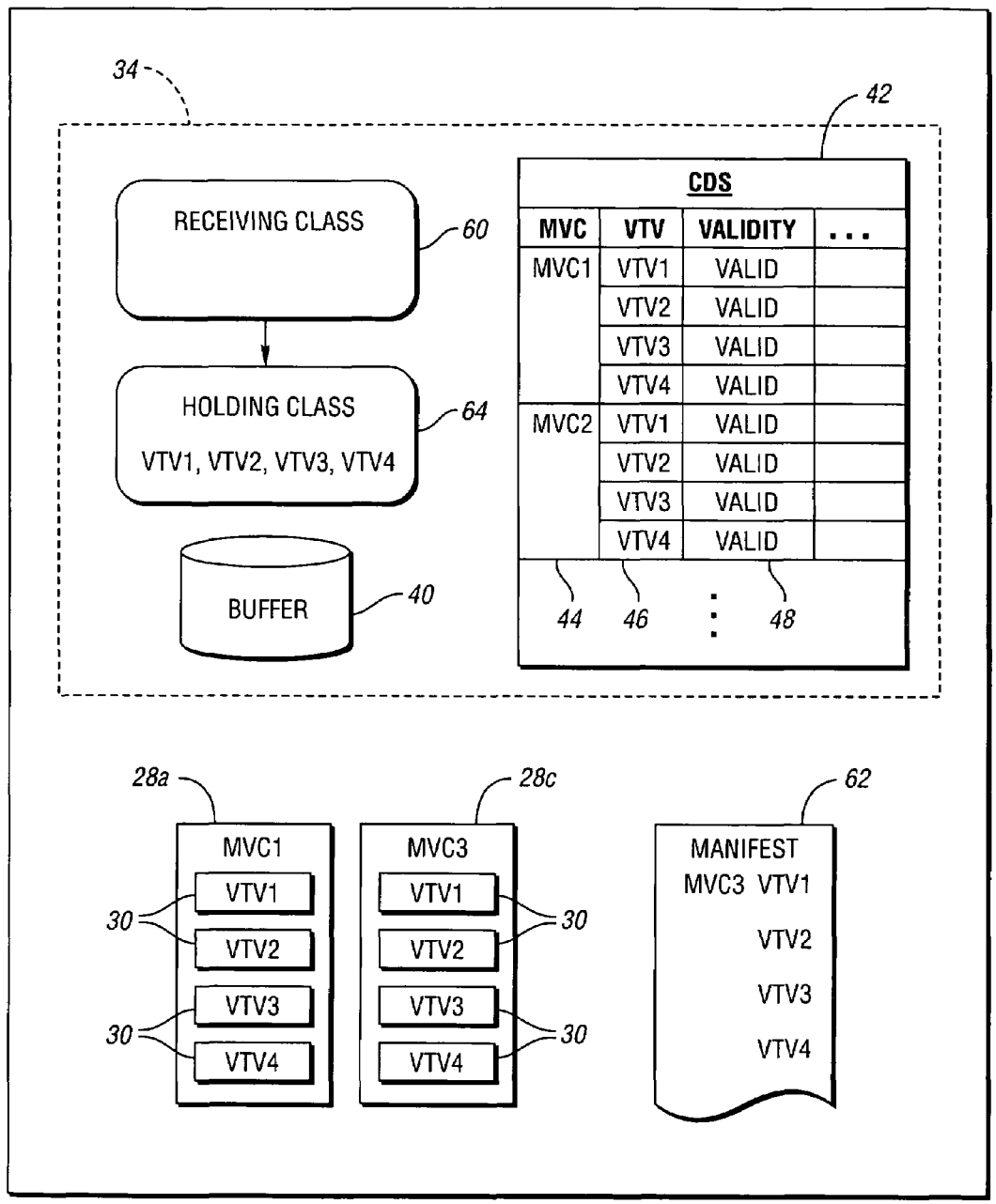
FIG. 2c is a schematic diagram illustrating operation of a holding class according to an embodiment of the present invention.
Figure 2B:
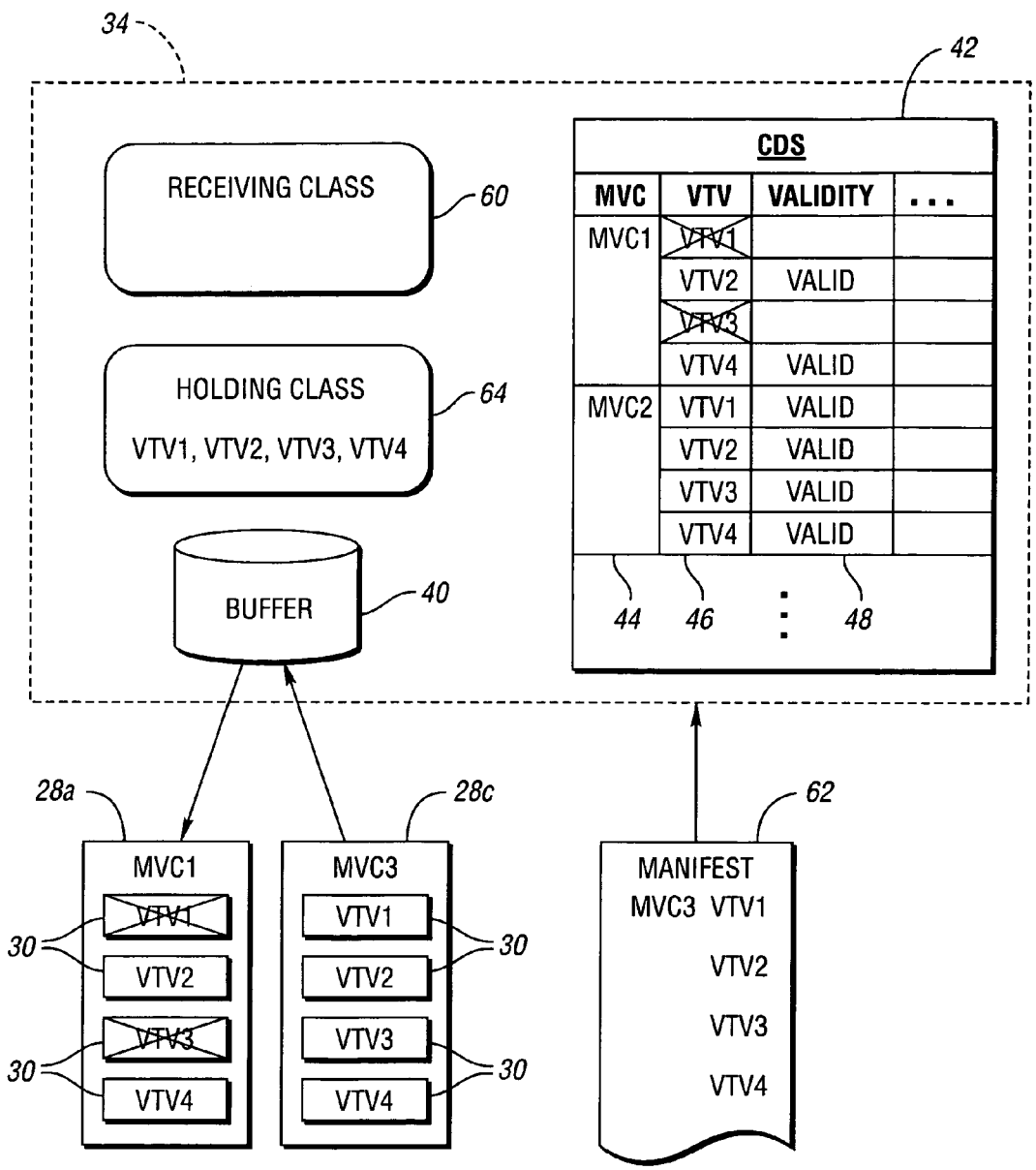

Referring now to FIG. 2c, a schematic diagram illustrating operation of a holding class according to an embodiment of the present invention is shown. Storage management system 34 includes holding management class 64. Preferably, receiving class 60 and holding class 64 are of the same or related class type. As with receiving class 60, holding class 64 may be implemented in a variety of ways. In addition, holding class 64 may be temporary or persistent within storage management system 34.

Once virtual tape volumes 30 have been written to MVC3, references to these virtual tape volumes 30 are moved into holding class 64 from receiving class 60. This may be accomplished by, for example, renaming receiving class 60. Alternatively, virtual tape volume references may be sent from receiving class 60 to holding class 64, copied to holding class 64 then deleted from receiving class 60, or the like.

The present invention has been implemented in storage management system 34 including a Virtual Tape Control System from Storage Technology Corporation. The copy process begins by running an export command that exports by virtual storage manager management class as follows:

Export MGMT (mgmtclas-list) MANIFEST (manifest dd).

Manifest file 62 is produced by running the Export command together with the additional copies of virtual tape volumes 30 on MVC3. A virtual tape volume report is run against the manifest file produced by the export command as follows:

VTVRPT MANIFEST (ddname) FLAT (flat-file-dd-name).

The output of this report command is a flat file used by the following maintenance utility:

VTVMAINT VTVid (vol-list) MGMTclas (new-mgmt-clas-name).

The VTVMAINT utility changes the virtual storage manager management class of virtual tape volumes 30 just processed from receiving class 60 to holding class 64 designated new-mgmt-clas-name.

Moving virtual tape volume references from receiving class 60 to holding class 64 permits writing a new virtual tape volume 30 onto MVC3 without having to rewrite virtual tape volumes 30 (VTV1-4) which have already been written. This facilitates automatic and distributed implementation of writing MVC3.

Referring now to FIG. 2d, a schematic diagram illustrating a local data recovery according to an embodiment of the present invention is shown. A determination is made that at least one virtual tape volume 30 on MVC1 is erroneous. This typically occurs when storage management system 34 attempts to read data from MVC1. A request for data may be generated within storage management system 34 or by a computing device in communication with storage management system 34. Storage management system 34 consults control data set 42 to determine which local multi-volume cartridge 28a contains virtual volume 30 with the requested data. If the desired multi-volume cartridge 28a cannot be located, is damaged, erased, or contains media from which some or all of the requested virtual tape volume 30 cannot be read, then multi-volume cartridge 28a is considered to be an erroneous copy. In FIG. 2d, VTV1 and VTV3 have been found to be erroneous on multi-volume cartridge 28a.

A copy of the requested data resides on MVC3. However, since MVC3 is not listed in control data set 42, storage management system 34 is not inherently aware of the existence of a local copy of the desired data. Storage management system 34 acquires knowledge that VTV1 and VTV3 exist on MVC3 by reading manifest 62. References to erroneous virtual tape volumes 30 are unlinked from storage management system 34 by disassociating VTV1 and VTV3 from MVC1 in control data set 42. VTV1 and VTV3 are then imported from MVC3 into buffer 40. If possible, VTV1 and VTV3 are then written onto MVC1. If not, a new multi-volume cartridge 28 may be used to implement MVC1. In either case, this operation relinks VTV1 and VTV3 with MVC1 in control data set 42.

Storage management system 34 including a Virtual Tape Control System may execute a sequence of commands for retrieving data found to be erroneous on MVC1. First, a drain command is run against the copy MVC3 within control data set 42 as follows:

MVCDRain MVC (Copy 3 MVC).

The drain command allows subsequent manipulation of data within control data set 42. A maintenance utility unlinks the faulty virtual tape volume copy 30 in MVC1 and prepares MVC1 for replacement with corresponding data from MVC3 as follows:

VTVMAINT VTV (error-VT ULINKMVC (Copy 1 MVC).

An import command then copies desired virtual tape volumes 30 into buffer 40 as follows:

IMPORT VTV (error-UV) REPLACE (ALL) IMMD-RAIN(YES) MANIFEST (manifest).

Desired virtual tape volume 30 is then migrated into receiving class 60 for processing into MVC1 or another suitable multi-volume cartridge 28a. At this point, data in migrated virtual tape volume 30 is available for normal recall processing.

Figure 2E:
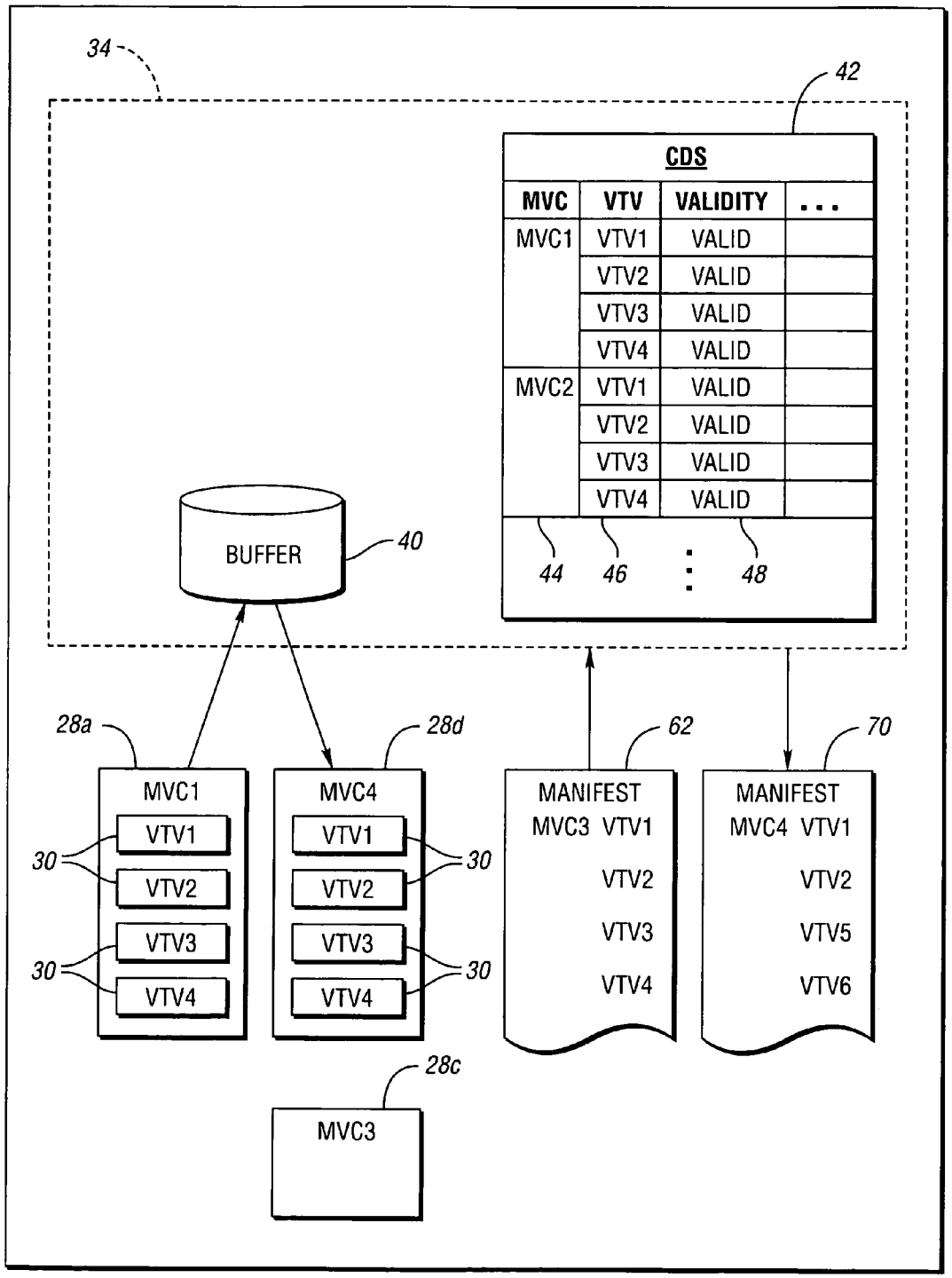
FIG. 2e is a schematic diagram illustrating an update of a third data copy according to an embodiment of the present invention.

Referring now to FIG. 2e, a schematic diagram illustrating an update of a third data copy according to an embodiment of the present invention is shown. One or more virtual tape volumes 30 on multi-volume cartridge 28a-c may become invalid. Virtual tape volumes 30 may become invalid due to the passage of time such as, for example, due to an expiration date set for virtual tape volume 30. Virtual tape volume 30 may also become invalid because data contained in virtual tape volume 30 has been rendered obsolete by more recently generated data. Storage management system 34 tracks the validity of data on multi-volume cartridge 28a and 28b using control data set 42. Storage management system 34 may replace invalid virtual tape volumes 30 with valid tape volumes 30 to efficiently utilize storage space on multi-volume cartridge 28a. As illustrated in FIG. 2e, virtual tape volumes VTV3 and VTV4 have been replaced by VTV5 and VTV6. However, virtual tape volumes 30 held on multi-volume cartridge 28c are not inherently known to storage management system 34. Therefore, MVC3 cannot be updated through control data set 42.

The contents of multi-volume cartridge 28c are occasionally considered to determine if multi-volume cartridge 28c is efficiently storing data. Manifest 62 indicating the contents of multi-volume cartridge 28c is read by storage management system 34 to obtain a list of virtual tape volumes 30 held by multi-volume cartridge 28c. Storage management system 34 determines if multi-volume cartridge 28c falls beneath a usage threshold. This usage threshold may be based, for example, on an amount of valid data remaining on multi-volume cartridge 28c. If multi-volume cartridge 28c falls beneath the usage threshold, storage management system 34 writes data corresponding to valid virtual tape volumes 30 still held by multi-volume cartridge 28c onto a new multi-volume cartridge (MVC4), indicated by 28d. MVC4 may also be written with additional virtual tape volumes 30. In the example illustrated in FIG. 2e, virtual tape volumes 30 from MVC1 are read into buffer 40 and then written into MVC4.

Storage management system 34 produces manifest file 70 indicating which virtual tape volumes 30 were written onto MVC4.

Storage management system 34 including a Virtual Tape Control System may execute a sequence of commands to produce updated multi-volume copy 28d. A report command is run against manifest file 62 as follows:

MVCRPT MANIFEST (ddname) FLATdd (ddname).

Storage management system 34 identifies any multi-volume cartridge 28c listed on manifest 62 which falls below a predetermined usage threshold such as, for example, 25% or less of valid data remaining. Storage management system 34 identifies valid virtual tape volumes 30 on any low threshold multi-volume cartridge 28c.

An export command is run on these virtual tape volumes 30 to create an additional copy MVC4 unknown to control data set 42 as follows:

EXPORT VTV (VTV-list) MANIFEST (ddname).

A drain command is run against low threshold multi-volume cartridge 28c as follows:

MVCDRain MVCid (vol-list).

The read-only bit is turned off on low threshold multi-volume cartridge 28c as follows:

MVCMAINT MVCid (vol-list) READONLY (OFF).

This allows MVC3 to be reused. Revised cumulative manifest file 70 is produced showing newly exported MVC4 and eliminating low threshold MVC3.

While embodiments of the invention have been illustrated and described, it is not intended that these embodiments illustrate and describe all possible forms of the invention. Rather, the words used in the specification are words of description rather than limitation, and various changes may be made without departing from the spirit and scope of the invention. For example, the terms "first," "second," "third," and "fourth" with regard to data cartridges have been used for ease of illustration and are not meant to restrict the number or type of data cartridges or to imply any order. Also, a tape system has been used in the example embodiment. However, any removable storage devices and their associated equipment may be used to implement the present invention. In addition, the example embodiments have used virtual tape volumes to refer to any kind of information sets held on removable storage devices. These information sets may include files, data sets, databases, and the like.

What is claimed is:

1. A method of managing more than two multi-volume copies in a storage management system recognizing a first multi-volume copy and a second multi-volume copy, each multi-volume copy holding at least one virtual volume, the first multi-volume copy and the second multi-volume copy listed in a control data set maintained by the storage management system, the control data set associating the first multi-volume storage device and the second multi-volume storage device with virtual volumes held thereon, the method comprising:

directing at least one virtual volume from the first multi-volume copy to a receiving management class within the storage management system;

exporting the at least one virtual volume to a third multi-volume copy based on the receiving management class, the third multi-volume copy unknown to the storage management system;

creating a manifest file listing the at least one exported virtual volume, the manifest file separated from the control data set;

determining that at least one of the exported at least one virtual volumes held on the first multi-volume copy is erroneous;

unlinking the at least one determined erroneous virtual volume from the storage management system; and importing into the storage management system the at least one determined erroneous virtual volume from the third multi-volume copy.

2. A method of managing more than two multi-volume copies in a storage management system as in claim 1 further comprising:

defining a second management class; and assigning the at least one virtual volume to the second management class.

3. A method of managing more than two multi-volume copies in a storage management system as in claim 2 further comprising repeating the steps of directing and exporting to the receiving management class.

4. A method of managing more than two multi-volume copies in a storage management system as in claim 1 further comprising removing the second multi-volume copy to a location remote from the storage management system.

5. A method of managing more than two multi-volume copies in a storage management system as in claim 1 further comprising:

determining that the third multi-volume copy falls beneath a usage threshold;

identifying the at least one virtual volume held on the third multi-volume copy based on the manifest file;

exporting at least one virtual volume, including the at least one identified virtual volume, from the storage management system to a fourth multi-volume copy; and producing a new manifest file listing the at least one virtual volume exported to the fourth multi-volume copy.

6. A method of managing more than two multi-volume copies in a storage management system as in claim 5 wherein the usage threshold is based on an amount of valid data remaining on the third multi-volume copy.

7. A system comprising:

a plurality of multi-volume storage devices, each multi-volume storage device operative to hold a plurality of data sets;

a storage management system for writing at least one data set onto each multi-volume storage device, the storage management system operative to (a) write at least one data set onto a first multi-volume storage device, (b) write the at least one data set onto a second multi-volume storage device, (c) list the first multi-volume storage device and the second multi-volume storage device in a control data set, the control data set associating the at least one data set with the first multi-volume storage device and the second multi-volume storage device, (d) direct the at least one data set to a receiving management class, (e) export to a third multi-volume storage device the at least one data set directed to the receiving management class, and (f) create a manifest file associating the third multi-volume storage device with the exported at least one data set, the manifest file separated from the control data set;

(g) determine that at least one of the at least one exported data sets written onto the first multi-volume storage device contains an unrecoverable error;

(h) disassociate the at least one determined first multi-volume storage device data set from the storage management system; and (i) import into the storage management system the at least one determined data set from the third multi-volume storage device.

8. A system as in claim 7 wherein the storage management system is further operative to direct the at least one data set to a second management class once the at least one data set has been exported.

9. A system as in claim 8 wherein the storage management system is further operative to direct at least one new data set to the receiving management class for exporting to the third multi-volume storage device.

10. A system as in claim 7 wherein the storage management system is further operative to:

determine that the third multi-volume storage device falls beneath a usage threshold;

identify each valid data set exported to the third multi-volume storage device based on the manifest file;

export at least one data set, including the at least one identified valid data set, from the storage management system to a fourth multi-volume storage device; and produce a new manifest file listing each data set exported to the fourth multi-volume copy.

11. A system as in claim 10 wherein the usage threshold is based on an amount of valid data remaining on the third multi-volume storage device.

\* \* \* \* \*